Patented May 29, 1934

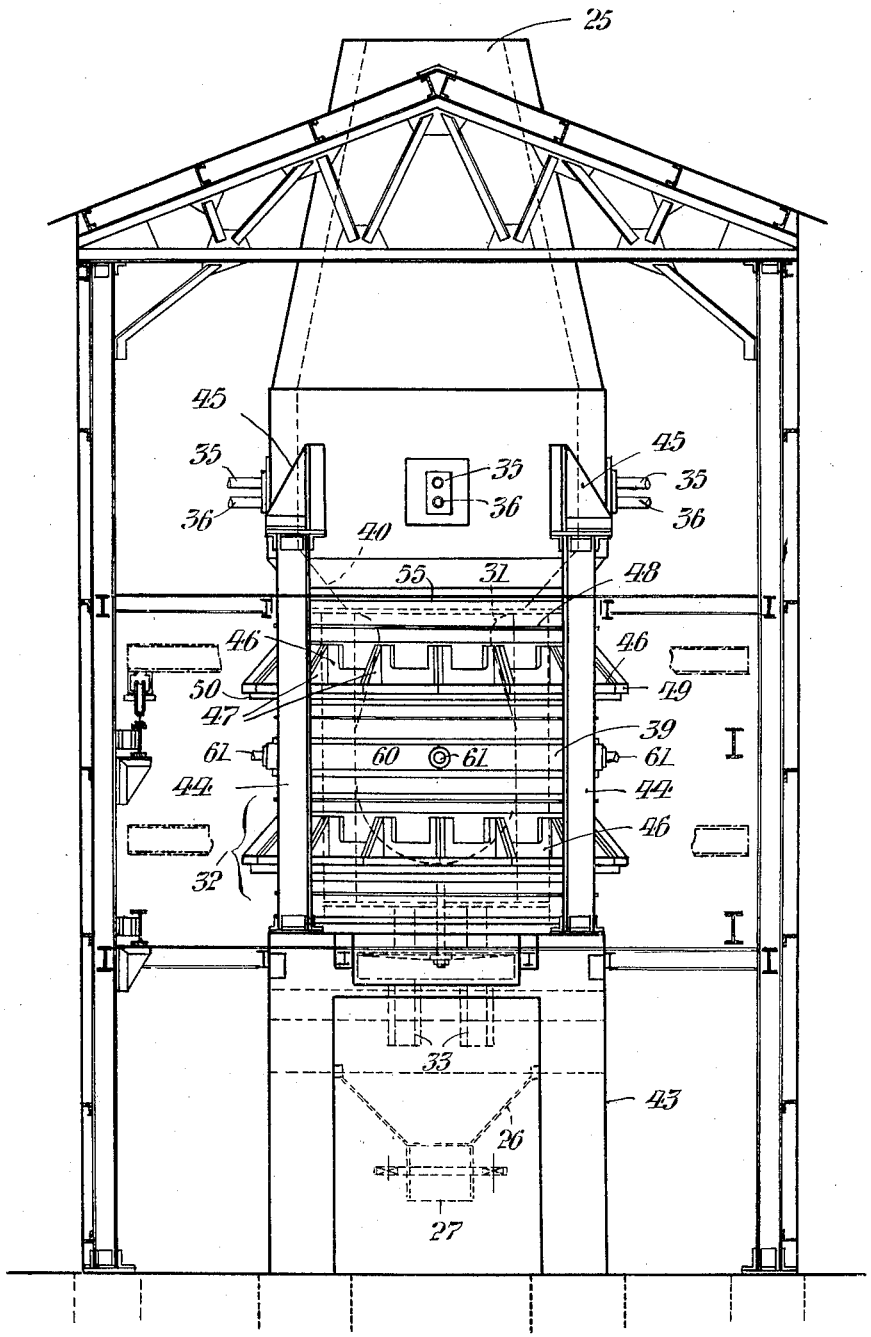

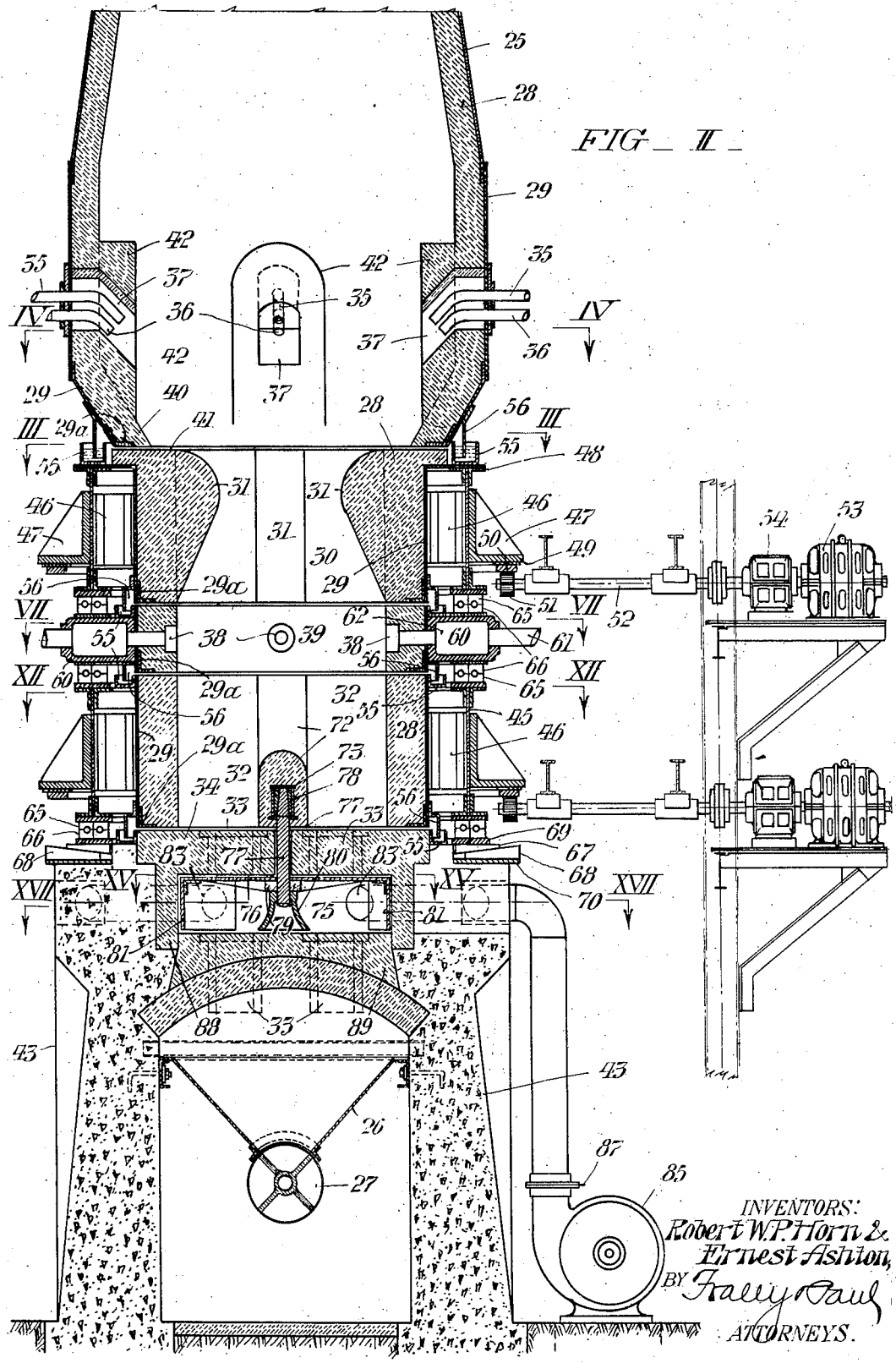

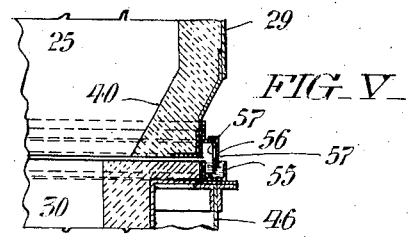
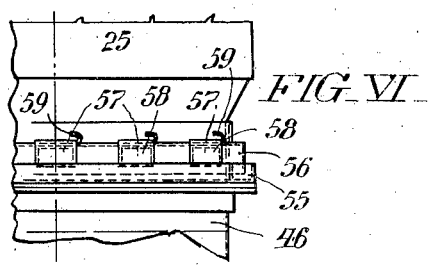
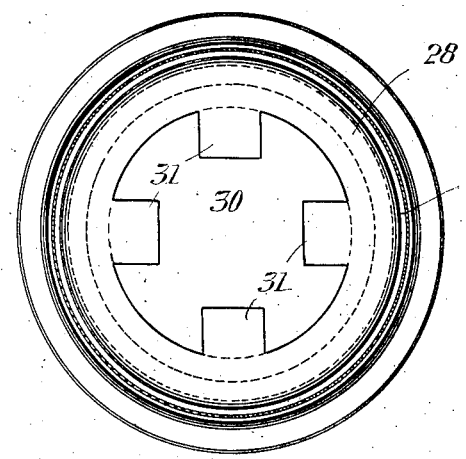
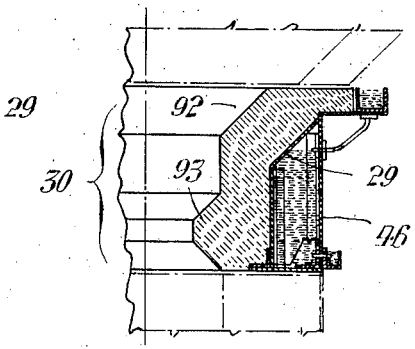
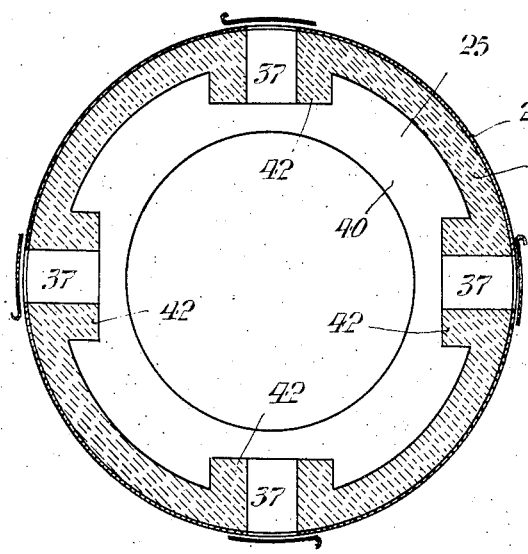
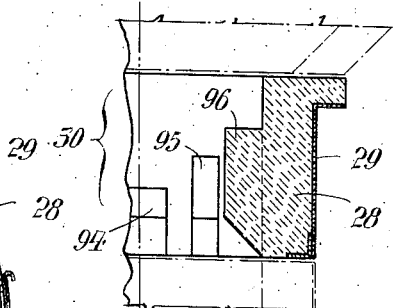

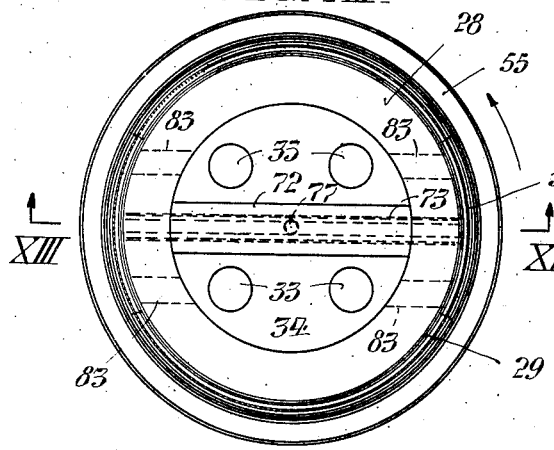
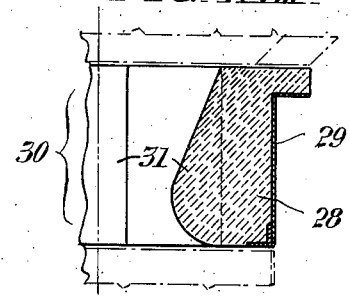
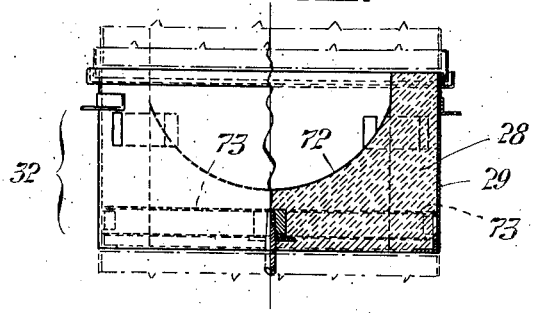
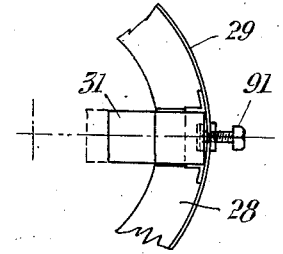
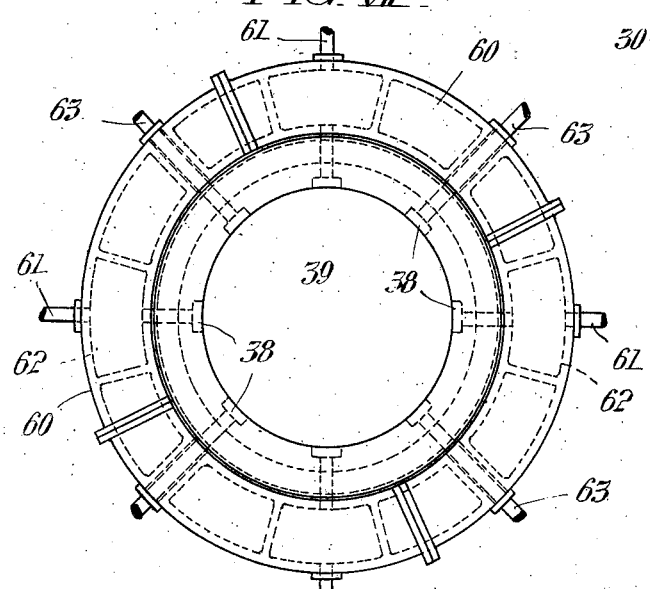
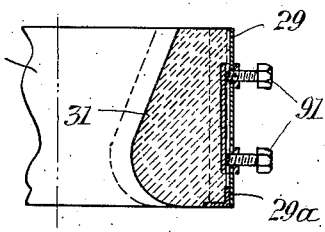

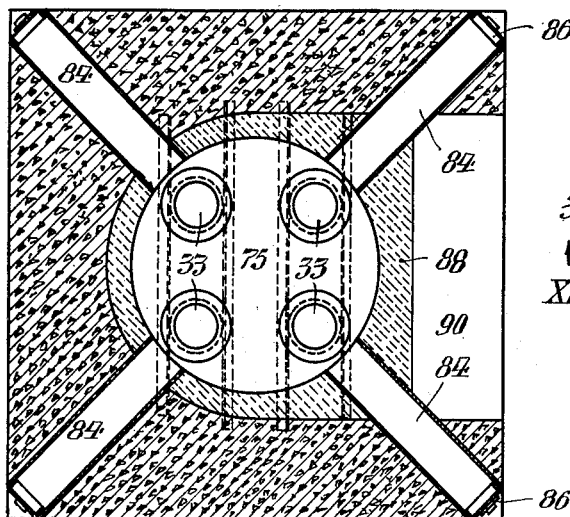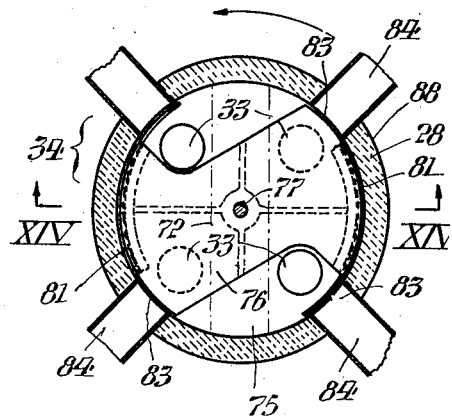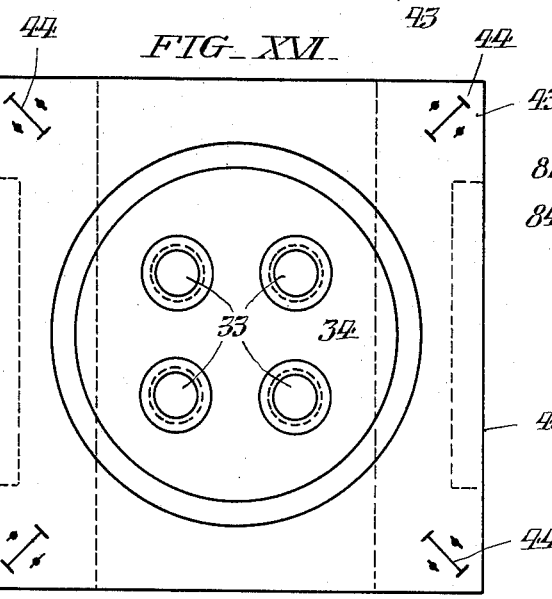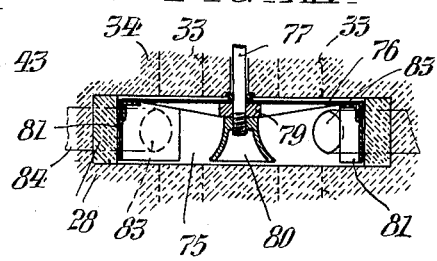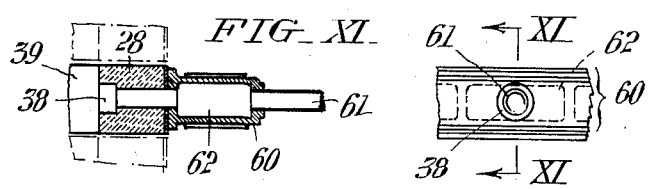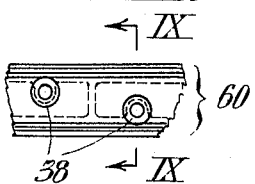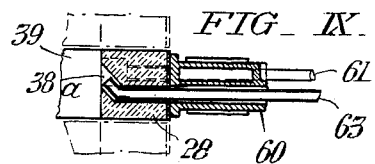

1,960,413

UNITED STATES PATENT OFFICE 1,960,413

FURNACE AND KILN AND THEIR OPERATION

Robert W. P. Horn and Ernest Ashton, Allentown, Pa.

Application May 13, 1932, Serial No. 611,000

11 Claims. (Cl. 222—3)

This invention relates to kilns or furnaces, and more especially upright kilns, for burning, calcining, or roasting cement, lime, magnesite, ores, or the like. The invention aims at improving the ease, efficiency, and economy of furnace operation, and also the quality and uniformity of the product and the output,—thus increasing the capacity of the furnace, and minimizing the fuel consumption. It also aims at accurate and flexible control of operation, including the flow of material treated as well as the supply of fuel and the admission of air, permitting adaptation of the operating conditions to a wide variety of raw materials and treatments,—as well as continuity of operation and efficient conservation of heat. It permits of effecting combustion substantially throughout the whole interior of an upright furnace, and of controlling and varying the temperature and other conditions in the various parts of the furnace as may be from time to time desired, and also of promoting and controlling the flow of the material treated, especially through the intensely heated areas or regions of the furnace. This adapts the furnace to varying degrees of pre-calcining, calcining, sintering, or roasting, according to the materials to be treated and the effects desired. Present upright furnaces or kilns, on the contrary, have an uncertain, unstable, and relatively uncontrollable line of demarcation between calcination and vitrification, for example.

In the illustrative furnace shown and described, there is afforded a major upper decarbonating zone, a rotative feeding and feed-control zone, a stationary air, gas, oil, or pulverized fuel zone, as well as a final zone with regulable air admission, wherein the air is preheated and the treated product is cooled in preparations for discharge, with interchangeable inlets at practically all regions for air, gas, oil, pulverized fuel, steam, or other fluid, and maximum exposure of the material treated in the maximum heat zone. When used for cement production, it allows of eliminating the usual preliminary drying and pulverization of the raw material.

In the drawings, Fig. I is a general elevation of a furnace or kiln conveniently embodying the invention.

Fig. II shows a vertical mid-section through the kiln, substantially at right angles to Fig. I and on a larger scale, the upper portion being broken away and omitted.

Fig. III shows a horizontal section through the kiln, taken as indicated by the line and arrows III—III in Fig. II, so that the subjacent portion of the kiln appears in plan.

Fig. IV shows a horizontal section through the upper portion of the kiln, taken as indicated by the line and arrows IV—IV in Fig. II, certain parts being omitted.

Fig. V is a fragmentary vertical sectional view illustrating a waterseal between adjacent parts of the kiln.

Fig. VI is a fragmentary side view of the waterseal structure, illustrating controllable air inlets therein for the admission of air through the clearance between the relatively moving sections when desired.

Fig. VII is a plan view of one of the horizontal sections of the kiln structure taken as indicated by the line and arrows VII—VII in Fig. II.

Fig. VIII is a fragmentary external edge view of a kiln section generally similar to that shown in Fig. VII.

Fig. IX is a fragmentary vertical section, taken as indicated by the line and arrows IX—IX in Fig. VIII.

Figs. X and XI are views similar to Figs. VIII and IX illustrating a modified construction, the section in Fig. XI being taken as indicated by the line and arrows XI—XI in Fig. X.

Fig. XII is a plan view of a lower section of the kiln, taken as indicated by the line and arrows XII—XII in Fig. II.

Fig. XIII is in part a side view of the section shown in Fig. XII and in part a vertical mid-section thereof, taken as indicated by the line and arrows XIII—XIII in Fig. XII.

Fig. XIV shows a fragmentary vertical section through a portion of the hearth and foundation of the furnace, in a different angular position from Fig. II, taken as indicated by the line and arrows XIV—XIV in Fig. XV.

Fig. XV shows a horizontal section through the hearth of the furnace, taken as indicated by the line and arrows XV—XV in Fig. II.

Fig. XVI is a plan of the hearth and foundation of the furnace, with the superjacent parts removed.

Fig. XVII shows a horizontal section through the hearth and foundation, taken as indicated by the line and arrows XVII—XVII in Fig. II.

Fig. XVIII shows a fragmentary vertical axial section through one of the revolving sections of the furnace, taken similarly to Fig. II, but showing a somewhat different internal configuration.

Fig. XIX is a fragmentary section similar to Fig. II, illustrating a modified construction permitting adjustment.

Fig. XX is a fragmentary plan view of the parts shown in Fig. XIX.

Fig. XXI is a view similar to Figs. XVIII and XIX, showing still a different construction of the revolving section of the furnace.

Fig. XXII is a view similar to Figs. XVIII and XXI, showing yet another construction.

As shown in Figs. I and II, the furnace or kiln is upright, and is enclosed in a suitable building of fireproof construction. The kiln is open at the top of its top portion or section 25 to receive raw material, and discharges the treated product from its bottom, into a closed air-tight bin or hopper 26. This hopper 26 is provided with an air sealing rotary discharge valve or gate 27. The kiln has a refractory lining 28 which is enclosed, for the most part, in an external metal shell 29. The downward feed of material through the kiln is controlled by a constricted zone at 30, in a corresponding (revolving) section of the furnace structure. Means are preferably provided for agitating the material at and above the constricted zone, such means being here shown (Figs. II and III) as consisting of inward projections or vertical ridges 31 of the refractory lining 28 of the revolving section 30. The agitation prevents self-jamming or arching of the material at the constricted zone 30, and also assures reasonably free passage of the combustion gases or products through the material, in a multiplicity of continually varying paths. Below the constricted zone 30, the interior of the kiln may be enlarged again, though not necessarily so large as the upper portion 25. The discharge from the lower (revolving) portion or section 32 of the kiln into the subjacent hopper 26, as through holes 33 in its refractory bottom 34, is also preferably controlled or regulated, as hereinafter described. The materials for combustion (air and fuel, preferably gaseous) may be introduced into the (stationary) top section 25 of the kiln, above the constricted feed-controlling zone 30, through nozzles 35, 36 directed diagonally downward through ports 37 in the refractory lining 28. Additional combustion material (air, and also, if desired, fuel gas, oil, or pulverized coal) may be introduced at an intermediate point or level, below the constricted zone 30, through radial ports 38 in a corresponding (stationary) portion or section 39 of the kiln, interposed between the revolving sections 30 and 32. Additional combustion fluid (air) may be introduced at the lower end of the kiln, through the aforementioned bottom holes 33, to rise through the descending material, which it cools while being itself thereby preheated.

As shown in Figs. I and II, the upper portion of the top section 25 has downward diverging walls, to permit a free descent of the raw material introduced at its top. Its intermediate portion is cylindrical, with vertical internal walls, and its lower portion is conically tapered inward, thus affording an internal shoulder 40 that retards somewhat the normal downflow of the raw material. The upper end of the refractory lining 28 in the revolving section 30 projects inward beyond the shoulder 40, thus affording a shelf or ledge 41 which assists in retarding the downflow of the material. As shown in Fig. IV, the combustion gas ports 37 of the top section 25 are formed in flat-faced-inward projections 42 on the lining 28, which prevent any bodily rotation of the material in the top section 25 under the influence of the subjacent revolving section 30. Accordingly, the revolution of section 30, with its inward projecting ridges or teeth 31, continually disarranges the material, obviating any tendency for it to arch itself across the interior of the kiln, or to form semi-permanent channels for flow of the combustion gases through it. The revolution also causes a downward central settling of the material, and a circumferential dislocation of the outer portions affected by the depth of the refractory teeth or projections 31. By a proper correlation of the shape and size of the section 30 (and its projections 31) with the adjacent parts and with the properties of the material to be treated in the kiln, the rate of passage of material through the kiln can be controlled and varied as required for properly burning, roasting, clinkering, or otherwise treating it.

The stationary top section may be supported from a concrete base or foundation 43 (Fig. I) by steel columns 44 to whose upper ends are attached angle brackets 45 secured to the external shell 29 of said section 25. As shown in Fig. II, the shell 29 of each section 25, 30, 39, 32, has an internal flange 29a at its lower end, to sustain its refractory lining 28.

An annular supporting structure 46 is associated with and surrounds the revolving kiln section 30, and is connected thereto by radial plates 47 which are attached by angle clips to the external shell 29 of section 30 and to the vertical annular web of the structure 46. The upper end of the structure 46 may also be attached to a horizontal flange 48 on the shell 29 of the section 30. Around the structure 46 is an angular girth casting or ring 49 provided on its lower side with a rack 50 that meshes with a pinion 51 on a horizontal drive shaft 52. The shaft 52 and the kiln section 30 may be driven by any suitable means, such as a variable speed electric motor 53 connected to the shaft 52 through interposed reduction gearing 54. The joint or clearance between the revolving section 30 and the superjacent stationary section 25 may be made fluid tight by means of a waterseal, consisting of an annular trough 55 mounted on top of the structure 46 and an annular Z-flange 56 (Fig. V) attached to the inward sloping lower end of the shell 29 of section 25, so as to dip into the trough 55, which in operation is normally filled with water. As shown in Figs. V and VI, supplemental air inlets 57 may be provided in the sealing flange 56. They can be controlled and regulated by any suitable means, such as angular damper plates 58 mounted on the sealing flange 56, and preferably provided with operating handles 59, for sliding them along.

As shown in Figs. II and VII, the stationary section 39 is surrounded by a chambered annular structure or casting 60 (preferably made in segments for convenience of assemblage) through which combustion material (air, and fuel also, if desired) may be supplied to the inlets 38. As shown in Fig. VII, air is supplied through connections 61 to four of the chambers 62 in the structure 60, which communicate with corresponding nozzles 38, while fuel may be supplied at intermediate points directly to the corresponding nozzles, through connections 63 that do not communicate with any of the chambers 62. As shown in Fig. VIII, the air and fuel connections 61, 63 (and the corresponding nozzles 38) may be offset vertically in alternation or staggered, so that the air is introduced near the top of the section 39 and fuel near its bottom, or vice-versa. As indicated in Fig. IX, the fuel nozzles 38a and their ports in the lining 28 may be directed diagonally upward, into the mass of material descending through the revolving section 30. As shown in Figs. X and XI, only air is supplied the nozzles 38, which are located at the medial plane of the section 39.

The structure 46 and the section 30 may be supported from the subjacent stationary structure 60 of section 39, by means of interposed anti-friction roller (ball) bearings whose annular races 65, 66 (made in halves for convenience in assemblage) are secured to the bottom of the structure 46 and to the top of the structure 60, respectively. A waterseal arrangement 55, 56 such as described above in connection with Fig. V may be provided to seal the joint or clearance between the revolving section 30 and the stationary section 39.

The lower revolving section 32 is generally similar in construction to the upper revolving section 30, and may be similarly driven,—though preferably in the opposite direction. Similar water seal arrangements 55, 56 may likewise be provided for the joints or clearance between the upper and lower edges of the revolving section 32 and the adjacent stationary section 39 and furnace bottom or hearth 34. Also, the lower revolving section 32 may be supported by anti-friction bearings similar to those employed from the upper revolving section 30, as indicated by the like reference numerals 65, 66.

While the intermediate stationary section 39 and structure 60 may be supported in any suitable way, as by attachment to the columns 44, it is in the present instance preferred to support it from the structure 46 associated with the lower revolving section 32. For this purpose, anti-friction bearings similar to those already mentioned may be interposed between the top of said lower structure 46 and the bottom of the intermediate structure 60, as indicated by the reference numerals 65, 66. As shown in Fig. II, provision may be made for vertically adjusting and axially aligning the sections 30, 39 and 32 by means of wedges 67, 68 interposed between a steel ring 69 associated with the lower race 66 and a steel ring 70 on the concrete foundation 43,—there being, of course, an ample number of such pairs of wedges suitably spaced around the furnace.

As shown in Figs. II, XII and XIII, the lower revolving section 32 has a diametral refractory rib or upright diaphragm 72 whose lower edge or surface is flush with that of the section itself, and whose upper edge may be semi-circularly rounded diametrically of the section 32, as shown in Fig. XIII, and also transversely rounded as shown in Fig. II. The member 72 may be reinforced with a built-up hollow metal beam structure 73 embedded therein, and having its ends secured to the shell 29 of section 32, as best shown in Fig. XIII. As shown in Figs. II, XIV and XV, the refractory bottom 34 of the kiln has a shallow circular cavity or chamber 75 co-axial with the kiln, and containing a metal diaphragm and valve plate 76. This diaphragm member 76 is connected to the revolving section 32 by a shaft 77 whose tapering upper end is screwed into a metal block 78 itself secured in the reinforcing member 73 of the refractory member 72. As shown in Fig. XIV, the lower end of the shaft 77 is shouldered at 79 to afford an abutment for the plate 76, which is secured thereto by a nut 80 screwed on the end of said shaft and having the material-deflecting form of a hollow bell. Thus the diaphragm 76 is rigid with the revolving lower section 32, so as to rotate with it.

As shown in Fig. XV, the diaphragm plate 76 is not a complete circle in outline, but is cut away at opposite points, so that in the position shown in Fig. XV it completely uncovers two of the discharge openings 33 in the furnace bottom 34, while covering the other two. During the revolution of the section 32, the transverse member or rib 72 alternately pushes the material over (and into) diametrically opposite discharge openings 33, and seals said openings. The annular relation of the member 72 to the diaphragm plate 76 is indicated (in dot and dash lines) in Fig. XV, as well as in Fig. II, and is such that each opening 33 is uncovered at both ends only during a fraction of each revolution of the section 32. Thus the discharge of the treated material through the openings 33 is controlled and regulated, so that a sufficient depth of such material is continuously maintained on the kiln bottom 34.

As shown in Figs. II, XIV and XV, the diaphragm plate 76 has depending segmental damper wings 81 which serve as valves for alternately opening and closing opposite combustion fluid (air) ports 83 in the peripheral wall of the chamber 75. The ducts 84 leading to the ports 83 may be open for natural draft, or may be connected to any suitable source of air under pressure, such as a centrifugal blower 85, and may be provided with individual adjustable damper valves 86. As shown, the blower 85 also has an outlet valve 87 controlling the supply of air to all ducts 84 that may be connected to the blower.

One suitable construction of the furnace bottom 34 and the associated portions of the base or foundation 43 is illustrated in Figs. II, XVI and XVII. As here shown, the refractory bottom portion 88 which contains the chamber 75 is made separate from the subjacent portion 89 through which extend the (always open) lower ends of the discharge openings 33, and the foundation 43 is laterally open at one side as shown at 90 to permit removal and replacement of the bottom portion 88. The concrete or brick work of the foundation or base 43 is preferably reinforced with steel wherever possible, to relieve excessive compression on the refractory material.

In operation, the top section 25 of the kiln is initially charged with any usual or suitable mixture of cement-producing material in proper proportions,—in lump, briquet, or slurry form,—after the lower sections 32, 39 and 30 have been charged with a mass of solid combustible material, as usual in this art. The combustible mass is then lit, and when it has been substantially consumed, and the cement producing material thereby heated, air and fuel are admitted at 35 and 36. Air (and also fuel, if desired) are also admitted at 38, under such pressure as may be necessary. However, the main supply of air for combustion is generally that through the chamber 75 and the superjacent openings 33,—by the blower 85, or other suitable means. The various controls above mentioned allow the temperature in various portions or regions of the kiln to be controlled and varied as desired for the material being treated. Speaking generally, however, it may be said that the material is initially and thoroughly preheated in the lower portion of the section 25, and that the calcination of the materials is completed in the subjacent sections 30, 39 and 32. During their passage through the section 39, the calcined materials come in direct contact with the sustained high temperature due to the air (and fuel) admitted through the nozzles 38.

While the construction and arrangement of parts described above is that which has been found most advantageous in experience heretofore, yet wide variation thereof is permissible, especially as regards the flow-controlling section 30. For example, its agitating ribs 31, which in Fig. II are shown rounded inward quadrantwise from the upper end of the section 30 to their point of greatest radial width, and thence tapering outward to nothing at the lower edge of the section 30, may be reversed, as shown in Fig. XVIII. These ribs 31 may also be made as separate parts set into grooves or recesses in the refractory lining 28 of the section 30, and provision may be made for adjusting their inward projection from the surface of the lining, as by means of set screws 91, 91, as indicated in Figs. XIX and XX. Or the section 30 may be made without projections 31, but bevelled inward at its upper end as shown at 92 in Fig. XXI, and may be provided with an annular rib 93 near its lower end, bevelled off at its upper and lower sides. As shown in Fig. XXI, also, the section 30 has an external water jacket between its shell 29 and the plate or web of its supporting structure 46, through which cooling water may be circulated. As shown in Fig. XXII, the revolving section 30 has internal vertical ribs 94, 95, 96, of varying vertical extent, square at their upper ends and bevelled outward at their lower ends. In cases where very refractory materials are to be reduced, or where liquefaction of the product is desirable, the fuel and air nozzles at 38 may be deflected downward (more or less like the nozzles 36) so as to make the lower revolving section 32 a self-discharging well furnace.

Moreover, a variety of combinations of sections such as shown may be used, for example, two sections like 30 and 39 may be substituted for section 32 in Fig. II; or an additional section 39 may be interposed between sections 25 and 30; or the section 39 may be duplicated, the arrangement of Fig. II itself being otherwise retained.

Having thus described our invention, we claim:

1. An upright furnace or kiln of the character described, substantially closed to the atmosphere except at one end, and including intermediate oppositely revolving sections, means for supplying raw material and regulated quantites of fuel and air to the kiln at an early stage in the passage of material therethrough, means for supplying additional fuel and air at a later stage, and means for discharging material from the kiln without substantial air admission.

2. An upright furnace or kiln of the character described, comprising a stationary refractory-lined section with an internal shoulder in its lower portion, a revolving section therebeneath with a shelf extending inward beyond said shoulder, and means therebelow for further restricting the downflow of material.

3. An upright furnace or kiln of the character described, comprising a stationary refractory-lined section, and a revolving section therebeneath with a plurality of inward projections into its interior reducing its effective opening and retarding flow through the section, and also preventing arching of the material.

4. A furnace or kiln as set forth in claim 3, further characterized by sharp reduction of the internal passage at the lower end of its said stationary section, so as to retard flow of material and combustion gases therethrough and thus promote heating of the material.

5. An upright furnace or kiln of the character described comprising a stationary infeed section, a subjacent revolving feed-controlling section, a stationary combustion-fluid-supply section below said revolving section, and a revolving discharge-controlling section below said combustion-fluid-supply section.

6. A furnace or kiln as set forth in claim 5, including rotating air supply means for supplying suitable quantities of air to the last-mentioned revolving section.

7. A furnace or kiln as set forth in claim 5, including means for supplying air at the lower end of the kiln to flow upward through the descending material, so as to be preheated while cooling the material.

8. A furnace or kiln as set forth in claim 5, including means for preventing arching of the material in the kiln.

9. A furnace as set forth in claim 5 including waterseals for the joints between relatively moving kiln sections.

10. An upright furnace or kiln of the character described comprising an upper stationary section, a revolving intermediate constricted feed-controlling section, a larger revolving discharge-controlling section therebeneath, and a stationary section between said revolving sections.

11. An upright furnace or kiln of the character described comprising an upper stationary section, a subjacent revolving constricted section, means for supplying fuel and air to heat the material above the constricted zone, a larger revolving discharge-controlling section below said constricted section, and means for supplying additional air at the lower end of the kiln to rise through the descending charge.

ROBERT W. P. HORN.
ERNEST ASHTON.